(12) United States Patent
Cheng

(10) Patent No.: US 9,897,737 B2
(45) Date of Patent: Feb. 20, 2018

(54) QUANTUM DOT BACKLIGHT MODULE

(71) Applicant: Wuhan China Star Optoelectronics Technology Co., Ltd., Wuhan, Hubei (CN)

(72) Inventor: Yan Cheng, Hubei (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 37 days.

(21) Appl. No.: 14/786,049

(22) PCT Filed: Jun. 23, 2015

(86) PCT No.: PCT/CN2015/082062
§ 371 (c)(1),
(2) Date: Dec. 31, 2015

(87) PCT Pub. No.: WO2016/187918
PCT Pub. Date: Dec. 1, 2016

(65) Prior Publication Data
US 2017/0146718 A1 May 25, 2017

(30) Foreign Application Priority Data
May 26, 2015 (CN) .......................... 2015 1 0274965

(51) Int. Cl.
*F21V 7/04* (2006.01)
*F21V 8/00* (2006.01)

(52) U.S. Cl.
CPC ......... *G02B 6/0026* (2013.01); *G02B 6/0023* (2013.01)

(58) Field of Classification Search
CPC ... G02B 6/0038; G02B 6/0016; G02B 6/0028
USPC .......................................................... 362/608
See application file for complete search history.

(56) References Cited

U.S. PATENT DOCUMENTS

| | | | |
|---|---|---|---|
| 2016/0087162 A1* | 3/2016 | Yao | H01L 33/504 257/98 |
| 2016/0341876 A1* | 11/2016 | Chen | G02B 6/0026 |
| 2016/0349427 A1* | 12/2016 | Lin | G02B 6/0088 |
| 2016/0380170 A1* | 12/2016 | He | G02B 6/0073 349/65 |

* cited by examiner

*Primary Examiner* — Ahshik Kim
(74) *Attorney, Agent, or Firm* — Kim Winston LLP

(57) ABSTRACT

A quantum dot backlight module is disclosed. The quantum dot backlight module comprises a light source; a quantum dot layer, which emits fluorescence after being excited by light that is emitted by the light source; and a light guide plate, which guides the fluorescence that is emitted by the quantum dot layer to a needed direction, wherein the quantum dot layer is arranged on a light-entering side of the light guide plate, and a colloid layer is arranged between the light source and the quantum dot layer so as to enable the light source and the quantum dot layer to be bonded with each other closely, whereby the light source, the quantum dot layer, and the light guide plate are assembled together. According to the present disclosure, the light transmission mode of the light source after entering into the light guide plate is changed through changing the structure of the quantum dot backlight module, so that the light loss thereof can be reduced, and the light-emitting efficiency of the backlight module can be improved.

19 Claims, 2 Drawing Sheets

QUANTUM DOT BACKLIGHT MODULE

CROSS REFERENCE TO RELATED APPLICATION

The present application claims benefit of Chinese patent application CN 201510274965.4, entitled "Quantum Dot Backlight Module" and filed on May 26, 2015, the entirety of which is incorporated herein by reference.

FIELD OF THE INVENTION

The present disclosure relates to the technical field of display, and particularly to a quantum dot backlight module.

BACKGROUND OF THE INVENTION

At present, the color gamut of the mainstream liquid crystal display devices, including the flat display devices, is only 72 percent more or less, and the color gamut of some liquid crystal display devices is even lower. In order to improve the color gamut of the display devices, the quantum dot backlight technology has been developed. The color gamut of the display devices can be improved to 100 percent by the quantum dot backlight technology, and thus the color performance ability of the display devices is greatly improved.

However, there are significant disadvantages in the two structures in the prior art in which the quantum dot backlight technology is frequently used. In one structure, a backlight module with a quantum dot glass tube is used. In the backlight module with this structure, a distance between a blue light source and a light guide plate is increased, and a size of a quantum dot strip is increased accordingly. Consequently, a coupling angle of the light guide plate to the light source is not enough, and thus an extraction efficiency of the light guide plate declines. In another structure, a backlight module with a quantum dot diaphragm is used. There are too many scatterings in the backlight module with this structure, and thus the light loss thereof is increased. Therefore, it is necessary to improve the traditional backlight module so as to increase the light-exiting efficiency thereof.

SUMMARY OF THE INVENTION

The present disclosure provides a quantum dot backlight module so as to solve the technical problem of low light-exiting efficiency of the backlight module in the prior art.

According to one embodiment, the present disclosure provides a quantum dot backlight module, comprising: a light source; a quantum dot layer, which emits fluorescence after being excited by light that is emitted by the light source; and a light guide plate, which guides the fluorescence that is emitted by the quantum dot layer to a required direction, wherein the quantum dot layer is arranged on a light-entering side of the light guide plate, and a colloid layer is arranged between the light source and the quantum dot layer so as to enable the light source and the quantum dot layer to be bonded with each other closely, whereby the light source, the quantum dot layer, and the light guide plate are assembled together.

According to one embodiment of the present disclosure, an opening is arranged on the light-entering side of the light guide plate, and the quantum dot layer is arranged in the opening, so that the light guide plate and the quantum dot layer are assembled together.

According to one embodiment of the present disclosure, a light efficiency amplification medium layer is affixed on a light-exiting side of the quantum dot layer, and the light efficiency amplification medium layer does not absorb the fluorescence that is emitted by the quantum dot layer.

According to one embodiment of the present disclosure, a refractive index of the light efficiency amplification medium layer is between the refractive index of air and a refractive index of a light guide material of the light guide plate.

According to one embodiment of the present disclosure, a medium material of the light efficiency amplification medium layer is one selected from a group consisting of modified polycarbonate, modified dimethyl siloxane resion, and polymethacrylic acid resion.

According to one embodiment of the present disclosure, the colloid layer is made of a colloid material with viscosity.

According to one embodiment of the present disclosure, a refractive index of the colloid material is between the refractive index of air and a refractive index of a quantum dot material of the quantum dot layer.

According to one embodiment of the present disclosure, an initial state of the colloid layer is a condensation state, and the colloid layer in a solid state is formed after solidification treatment, so that the quantum dot layer and the light source are bonded closely.

According to one embodiment of the present disclosure, the light-entering side of the light guide plate is arranged on a lateral surface thereof.

According to one embodiment of the present disclosure, the light-entering side of the light guide plate is arranged on a bottom surface thereof.

According to the present disclosure, the light transmission mode of the light source after entering into the light guide plate is changed through changing the structure of the quantum dot backlight module, so that the light loss thereof can be reduced, and the light-emitting efficiency of the backlight module can be improved.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

The present disclosure will be illustrated in detail hereinafter in combination with the accompanying drawings to make the purpose, technical solutions, and advantages of the present disclosure more clear.

Figure 1:
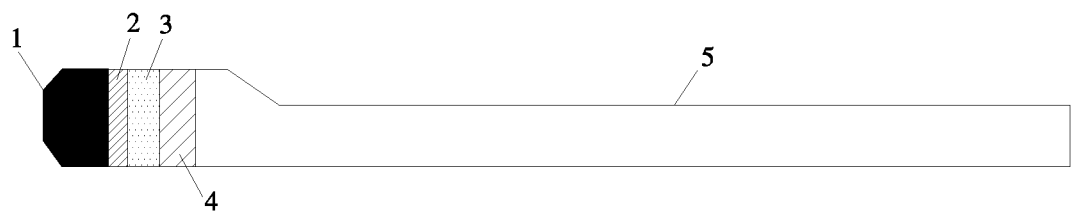
FIG. 1 is a sectional view of a quantum dot backlight module according to one embodiment of the present disclosure.
Figure 2:
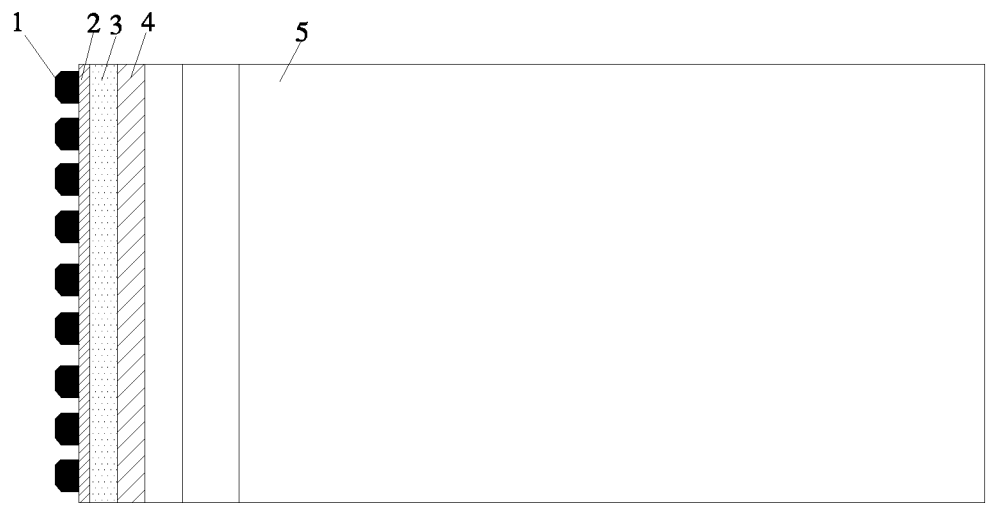
FIG. 2 is a top view of FIG. 1.

FIG. 1 is a sectional view of a quantum dot backlight module according to one embodiment of the present disclosure, and FIG. 2 is a top view of FIG. 1. The present disclosure will be illustrated in detail hereinafter with reference to FIG. 1 and FIG. 2.

As shown in FIG. 1 and FIG. 2, the backlight module comprises a light source 1, a quantum dot layer 3, and a light guide plate 5. The light source 1 is used for exciting quantum dots of the quantum dot layer 3, so that the quantum dots can emit fluorescence. The light source 1 is generally made of Light-Emitting Diode (LED) chips or Cold Cathode Fluorescent Lamps (CCFL), and the present disclosure will be illustrated taking the light source 1 made of LED chips as an example. As shown in FIG. 2, an LED light bar that is made of a plurality of LED chips serves as the light source 1.

The quantum dots of the quantum dot layer 3 can emit spectrum when being excited by the light that is emitted by the light source 1. The photoelectric property of the quantum dots depends on the size and the shape thereof, and thus the spectrum emitted by the quantum dots can be changed through changing the size and the shape thereof. Compared with the backlight module in the prior art in which the light that is emitted by the traditional LED light source or CCFL is directly transmitted to the light guide plate 5, the quantum dot layer 3 according to the present disclosure can emit fluorescence after being excited by the traditional light source. Therefore, the color gamut of the backlight module can be improved effectively, and thus the light-emitting efficiency of the light source can be improved.

The light guide plate 5 is used for changing the transmission direction of the light transmitting therein. Specifically, the fluorescence that is emitted by the quantum dot layer 3 exits from the light guide plate 5 after being guided to a required direction by the light guide plate 5.

According to one embodiment of the present disclosure, the quantum dot layer 3 is arranged on a light-entering side of the light guide plate 5, so that the quantum dot layer 3 and the light guide plate 5 can be combined. Moreover, a colloid layer 2 is arranged between the light source 1 and the quantum dot layer 3 so as to enable the light source 1 and the quantum dot layer 3 to be bonded with each other closely. In this manner, the light source 1, the quantum dot layer 3, and the light guide plate 5 can be assembled together to form the backlight module.

According to one embodiment of the present disclosure, the colloid layer 2 is made of a colloid material with viscosity, and a refractive index of the colloid material is between the refractive index of air and a refractive index of a quantum dot material of the quantum dot layer 3. According to one embodiment of the present disclosure, an opening is arranged on the light-entering side of the light guide plate 5, and the quantum dot layer 3 is arranged in the opening, so that the light guide plate 5 and the quantum dot layer 3 are assembled together.

In the prior art, the light source, the quantum dot layer that is packaged in a glass tube, and the light guide plate which are arranged separately are generally assembled together by brackets so as to form the backlight module. Specifically, a bracket for connection is arranged between the light source and the glass tube, and a bracket for connection is arranged between the glass tube and the light guide plate. In the backlight module with this structure, the light that is emitted by the light source can only reach the quantum dot layer after passing through an air layer at a position of the bracket between the light source and the glass tube, and the fluorescence that is emitted by the quantum dot layer can only reach the light guide plate after passing through an air layer at a position of the bracket between the glass tube and the light guide plate.

However, according to the present disclosure, the light that is emitted by the light source 1 reaches the quantum dot layer 3 after passing through the colloid layer 2. During practical applications, the colloid layer 2 can be arranged as thin as possible according to actual needs, so that a distance between the light source 1 and the quantum dot layer 3 can be reduced, and the light loss thereof can be reduced accordingly. In addition, the colloid layer 2 is made of a material with viscosity, so that the light source 1 and the quantum dot layer 3 can be bonded with each other closely on the condition that the light transmission distance thereof is shortened.

According to one embodiment of the present disclosure, during the process that the colloid layer 2 is formed, an initial state of the colloid layer 2 is a condensation state, and the colloid layer in a solid state is formed after solidification treatment, so that the quantum dot layer 3 and the light source 1 can be bonded closely. The heating solidification method and the ultraviolet solidification method are generally used, and the solidification process is irreversible. The colloid material with the condensation initial state is used, and the quantum dot layer 3 and the light source 1 can be bonded together by the colloid layer in the solid state after solidification treatment, which would facilitate the close bonding between the quantum dot layer 3 and the light source 1.

In addition, according to the present disclosure, the quantum dot layer 3 is arranged in the opening of the light guide plate 5. That is, apart from the part which contacts the colloid layer 2, the other part of the quantum dot layer 3 is packaged in the light guide plate 5. In this case, a chemical reaction between the quantum dot layer 3 and air can be avoided, and thus the property of the quantum dot layer would not be affected. Moreover, the quantum dot layer can be avoided from being scraped, so that the reliability thereof can be improved. The quantum dot layer is packaged in the light-entering side of the light guide plate 5, so that the quantum dot layer can be prevented from moving, and the quantum dot layer can emit stable fluorescence. Since the quantum dot layer 3 is arranged in the opening of the light guide plate 5, the fluorescence that is emitted by the quantum dot layer 3 can reach the light guide plate 5 without passing through air layer. In this manner, a distance between the quantum dot layer 3 and the light guide plate 5 can be shortened, and thus the light loss thereof can be reduced. Therefore, the light source 1, the quantum dot layer 3, and the light guide plate can be assembled together through arranging the quantum dot layer 3 in the opening of the light guide plate 5 and bonding the quantum dot layer 3 and the light source 1 with each other through the colloid layer 2.

When the light enters into another medium from one medium, not only refraction would occur, but also total reflection would possibly occur at an interface of the two media. According to the Fresnel equation, the loss of the light at the interface depends on an incident direction of the light, a refractive index of an incident medium, and a refractive index of an exit medium. Under the circumstance that the incident direction of the light cannot be changed, the light-exiting efficiency thereof can only be improved effectively through reducing the influence of the interface, i.e., reducing a difference between the refractive indexes of the incident medium and the exit medium.

The present disclosure will be illustrated taking the light source 1 made of LED chips as an example. When the backlight module is in the work state, the light that is emitted by the plurality of LED chips enters into the colloid layer 2 from a light-emitting layer, and the refraction would occur at an interface between the light-emitting layer and the colloid layer 2. Here, an incident angle is defined as θ, a refractive angle is defined as α, and a critical angle when the total reflection occurs is defined as β. When α is 90°, the angle θ is equal to the angle β. When θ is larger than β, the total reflection would occur to this part of light, which would be reflected back to the LED light source 1.

A refractive index of a light-emitting layer material of the LED chip light source is defined as N1, and a refractive index of the colloid layer 2 is defined as N2. Therefore, N1 Sin θ=N2 Sin α according to the refraction law of light. When the total reflection occurs, α=90°, θ=β, and thus N1 Sin β=N2, i.e., Sin β=N2/N1. Since the refractive index N2 of the colloid layer 2 is larger than the refractive index of air, when the light that is emitted by the LED chips light source enters into the colloid layer 2, the critical angle β when the total reflection occurs is larger than the critical angle when the light enters into air directly. In this case, the part of light, to which the total reflection would occur at the interface between the light source and air, and which cannot be refracted into air, can enter into the colloid layer 2 and then into the quantum dot layer 3 after a refraction at the interface between the LED light source and the colloid layer 2. Therefore, the light loss thereof can be reduced, and the light-emitting efficiency of the backlight module can be improved.

The refractive index of the colloid layer 2 should be larger than the refractive index of air as aforesaid, and should be less than a refractive index of the quantum dot layer 3 at the same time, so that the total reflection at an interface between the colloid layer 2 and the quantum dot layer 3 can be avoided, and the light that is emitted by the light source 1 can excite the quantum dots of the quantum dot layer 3 as much as possible. In addition, on the condition that the refractive index of the colloid layer 2 meets the requirement, the light transmittance thereof should be arranged as high as possible.

According to one embodiment of the present disclosure, a light efficiency amplification medium layer 4, which does not absorb the fluorescence that is emitted by the quantum dot layer 3, is affixed on a light-exiting side of the quantum dot layer 3, as shown in FIG. 1 and FIG. 2. The light efficiency amplification medium layer 4 does not absorb the light transmitting therein. Therefore, compared with the case that the light enters into the light guide plate 5 through air layer in the prior art, the scattering and absorption of air layer can be avoided, and thus the light loss thereof can be reduced.

According to one embodiment of the present disclosure, a refractive index of the light efficiency amplification medium layer 4 is between the refractive index of air and a refractive index of a light guide material of the light guide plate 5, so that the total reflection can be avoided when the fluorescence that is emitted by the quantum dot layer 3 reaches an interface between the light efficiency amplification medium layer 4 and a light guide material of the light guide plate 5. In this case, the light loss during the transmission can be reduced as much as possible, and thus a light transmission distance can be increased. Since the fluorescence that is emitted by the quantum dot layer 3 can only reach the light guide plate 5 after passing through the light efficiency amplification medium layer 4, the light transmittance of the light efficiency amplification medium layer 4 should be arranged as large as possible. In general, on the condition that the refractive index of the light efficiency amplification medium layer 4 meets the requirement, the light transmittance thereof can be arranged to be larger than 85 percent.

According to one embodiment of the present disclosure, a medium material of the light efficiency amplification medium layer 4 is one selected from a group consisting of modified polycarbonate, modified dimethyl siloxane resion, and polymethacrylic acid resion. These medium materials all have good mechanical endurance, heat resistance, weatherability, and relatively high light transmittance. Therefore, these medium materials are suitable for forming the light efficiency amplification medium layer 4. Of course, the material for forming the light efficiency amplification medium layer 4 is not limited by the aforesaid medium materials.

According to one embodiment of the present disclosure, the light-entering side of the light guide plate 5 is arranged on a lateral surface thereof. That is, the incident light enters into the light guide plate 5 from the lateral surface thereof. The light guide plate with this structure is shown in FIG. 1 and FIG. 2. According to another embodiment of the present disclosure, the light-entering side of the light guide plate 5 is arranged on a bottom surface thereof, i.e., the incident light enters into the light guide plate 5 from the bottom surface thereof. The light guide plates with the two structures all can be used in the backlight module according to the present disclosure.

Figure 3:
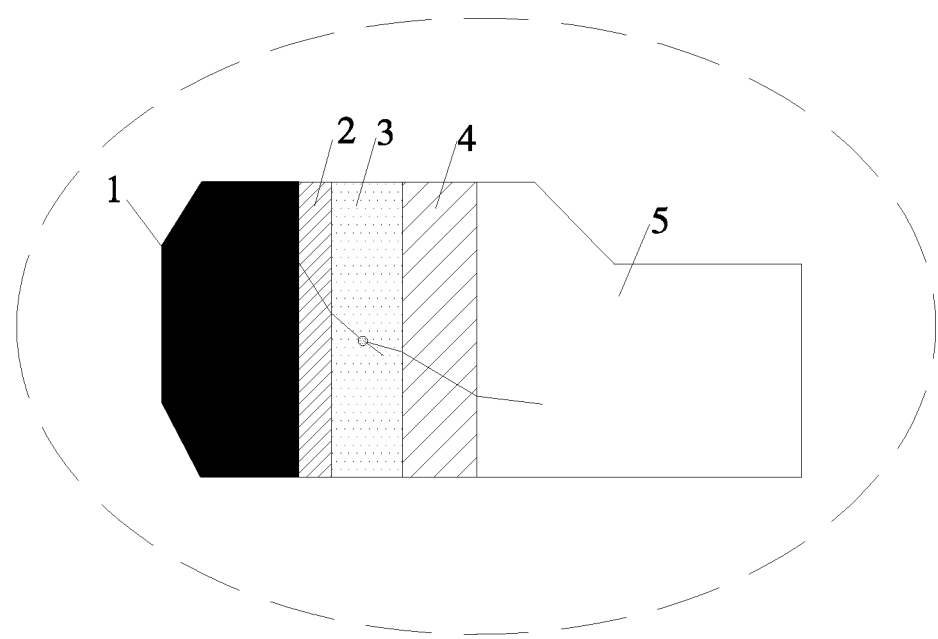
FIG. 3 schematically shows a light transmission route when the quantum dot backlight module as shown in FIG. 1 is in a work state.

FIG. 3 schematically shows a light transmission route when the backlight module as shown in FIG. 1 and FIG. 2 is in a work state. As shown in FIG. 3, the present disclosure will be illustrated taking the case that the light source 1 emits blue light as an example. The blue light that is emitted by the light source 1 reaches the quantum dot layer 3 after passing through the colloid layer 2, and the quantum dots of the quantum dot layer 3 would be excited by the blue light. The quantum dots can emit red light and green light upon the excitation, and the light emitted by the quantum dots depends on the shape and the size thereof. The red light and the green light that are emitted by the quantum dots after excitation mix with the blue light that is emitted by the light source into white light. The white light then reaches the light guide plate 5 after passing through the light efficiency amplification medium layer 4 which does not absorb the light. During this process, the light loss can be reduced, and the light-emitting efficiency of the backlight module can be improved because of the existence of the colloid layer 2 and the light efficiency amplification medium layer 4.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A quantum dot backlight module, comprising:
   a light source;
   a quantum dot layer, which emits fluorescence after being excited by light that is emitted by the light source; and
   a light guide plate, which guides the fluorescence that is emitted by the quantum dot layer to a required direction,
   wherein the quantum dot layer is arranged on a light-entering side of the light guide plate, and a colloid layer is arranged between the light source and the quantum dot layer so as to enable the light source and the quantum dot layer to be bonded with each other closely, whereby the light source, the quantum dot layer, and the light guide plate are assembled together.

2. The quantum dot backlight module according to claim 1, further comprising an opening, which is arranged on the light-entering side of the light guide plate, and the quantum dot layer is arranged in the opening, so that the light guide plate and the quantum dot layer are assembled together.

3. The quantum dot backlight module according to claim 2, further comprising a light efficiency amplification medium layer, which is affixed on a light-exiting side of the quantum dot layer, and the light efficiency amplification medium layer does not absorb the fluorescence that is emitted by the quantum dot layer.

4. The quantum dot backlight module according to claim 3, further comprising a refractive index of the light efficiency amplification medium layer, which is between the refractive index of air and a refractive index of a light guide material of the light guide plate.

5. The quantum dot backlight module according to claim 4, further comprising a medium material of the light efficiency amplification medium layer, which is one selected from a group consisting of modified polycarbonate, modified dimethyl siloxane resion, and polymethacrylic acid resion.

6. The quantum dot backlight module according to claim 1, wherein the colloid layer is made of a colloid material with viscosity.

7. The quantum dot backlight module according to claim 6, further comprising a refractive index of the colloid material, which is between the refractive index of air and a refractive index of a quantum dot material of the quantum dot layer.

8. The quantum dot backlight module according to claim 7, wherein an initial state of the colloid layer is a condensation state, and the colloid layer in a solid state is formed after solidification treatment, so that the quantum dot layer and the light source are bonded closely.

9. The quantum dot backlight module according to claim 1, wherein the light-entering side of the light guide plate is arranged on a lateral surface thereof.

10. The quantum dot backlight module according to claim 1, wherein the light-entering side of the light guide plate is arranged on a bottom surface thereof.

11. The quantum dot backlight module according to claim 2, wherein the colloid layer is made of a colloid material with viscosity.

12. The quantum dot backlight module according to claim 11, wherein a refractive index of the colloid material is between the refractive index of air and a refractive index of a quantum dot material of the quantum dot layer.

13. The quantum dot backlight module according to claim 12, wherein an initial state of the colloid layer is a condensation state, and the colloid layer in a solid state is formed after solidification treatment, so that the quantum dot layer and the light source are bonded closely.

14. The quantum dot backlight module according to claim 3, wherein the colloid layer is made of a colloid material with viscosity.

15. The quantum dot backlight module according to claim 14, further comprising a refractive index of the colloid material, which is between the refractive index of air and a refractive index of a quantum dot material of the quantum dot layer.

16. The quantum dot backlight module according to claim 15, wherein an initial state of the colloid layer is a condensation state, and the colloid layer in a solid state is formed after solidification treatment, so that the quantum dot layer and the light source are bonded closely.

17. The quantum dot backlight module according to claim 4, wherein the colloid layer is made of a colloid material with viscosity.

18. The quantum dot backlight module according to claim 17, further comprising a refractive index of the colloid material, which is between the refractive index of air and a refractive index of a quantum dot material of the quantum dot layer.

19. The quantum dot backlight module according to claim 18, wherein an initial state of the colloid layer is a condensation state, and the colloid layer in a solid state is formed after solidification treatment, so that the quantum dot layer and the light source are bonded closely.

* * * * *